United States Patent

Schroeder et al.

[11] Patent Number: 5,826,948
[45] Date of Patent: Oct. 27, 1998

[54] TWO-PIECE PLASTIC WHEEL FOR LIGHTWEIGHT AUTOMOBILES

[75] Inventors: Del C. Schroeder, Bloomfield Hills; John G. Argeropoulos, Sterling Heights, both of Mich.

[73] Assignee: Chrysler Corporation, Auburn Hills, Mich.

[21] Appl. No.: 832,134

[22] Filed: Apr. 3, 1997

Related U.S. Application Data

[63] Continuation of Ser. No. 542,495, Oct. 13, 1995, abandoned.

[51] Int. Cl.$^6$ .................. B60B 3/08; B60B 5/02
[52] U.S. Cl. ........................ 301/64.7; 301/64.3
[58] Field of Search ................ 301/63.1, 64.2, 301/64.3, 64.4, 64.5, 64.7, 37.43

[56] References Cited

U.S. PATENT DOCUMENTS

| | | | |
|---|---|---|---|
| 1,435,529 | 11/1922 | Killen | 301/64.3 |
| 1,479,417 | 1/1924 | Leonard | 301/64.4 |
| 1,573,238 | 2/1926 | Forsyth | 301/64.3 |
| 2,973,220 | 2/1961 | White | 296/901 |
| 3,369,843 | 2/1968 | Prew | 301/64.7 X |
| 3,695,728 | 10/1972 | Haussels | 301/64.7 X |
| 3,790,219 | 2/1974 | Watts | 301/64.2 |
| 3,826,538 | 7/1974 | Lipper | 301/64.4 |
| 4,072,358 | 2/1978 | Ridha | 301/64.7 |
| 4,344,655 | 8/1982 | Pellegrino | 301/64.7 X |
| 4,358,162 | 11/1982 | Schneider et al. | 301/64.7 X |
| 4,438,971 | 3/1984 | Zadel | 296/901 |
| 4,440,434 | 4/1984 | Celli | 296/901 |
| 4,453,763 | 6/1984 | Richards | 296/901 |
| 5,009,463 | 4/1991 | Saitoh | 296/901 |
| 5,133,591 | 7/1992 | Skaggs et al. | 301/64.3 |
| 5,286,080 | 2/1994 | Ringdal | 296/901 |
| 5,577,809 | 11/1996 | Chase | 301/37.43 |

FOREIGN PATENT DOCUMENTS

| | | | |
|---|---|---|---|
| 754523 | 11/1933 | France | 301/64.4 |
| 3620097 | 12/1987 | Germany | 301/64.3 |
| 3620097-A | 12/1987 | Germany . | |
| 642952 | 7/1962 | Italy | 301/64.4 |
| 324549 | 1/1930 | United Kingdom | 301/64.4 |

*Primary Examiner*—Russell D. Stormer

[57] ABSTRACT

A wheel for a lightweight plastic automobile includes a unitarily-molded outboard plastic rim defining an inboard-oriented engagement surface and a unitarily-molded inner plastic rim defining an outboard-oriented engagement surface. The engagement surfaces are conformed alike so as to interlock together, and the surfaces are adhesively bonded together to establish a strong, compliant wheel. Rivets further connect the rims to prevent the rims from peeling apart. The wheel is mounted on the automobile by a plurality of lug nuts, each of which is integrally formed with a washer having a large surface area. The large surface area of the washer permits firmly tightening the lug nuts while avoiding "scalloping" of the plastic wheel when the washers are tightly urged against the wheels.

5 Claims, 2 Drawing Sheets

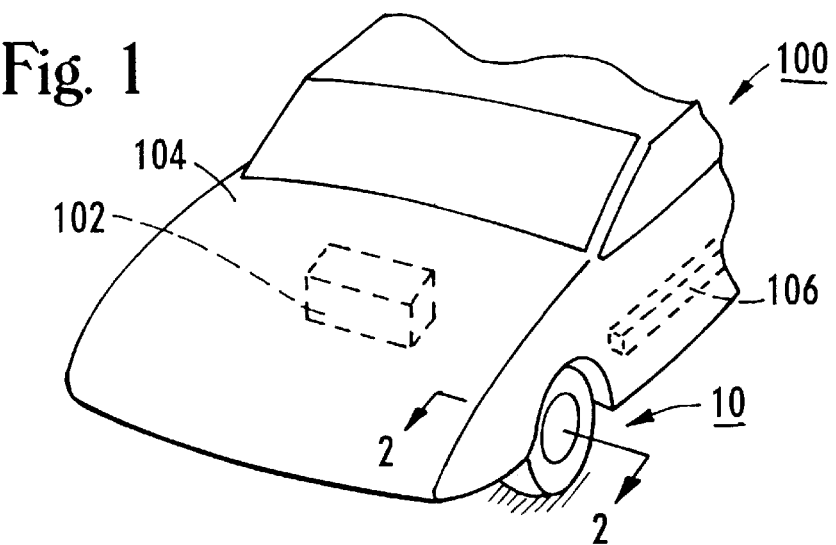
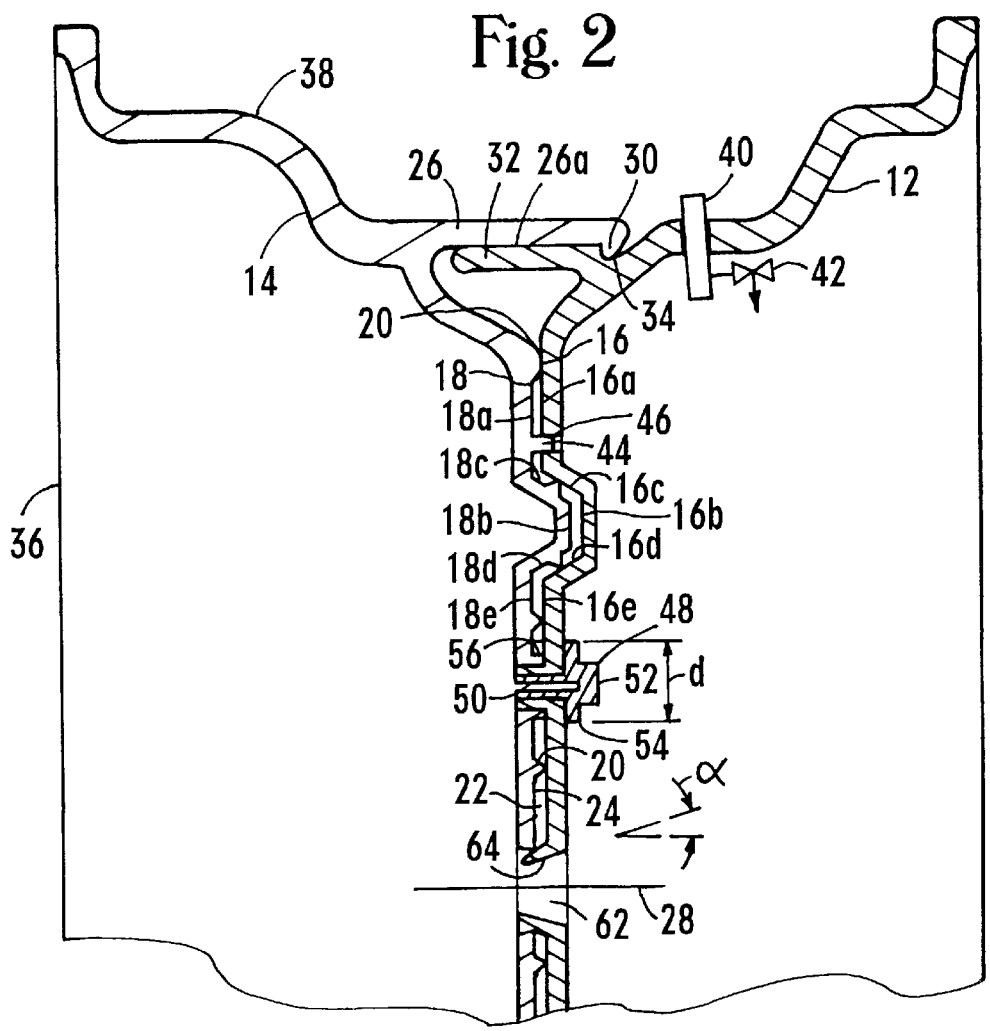

TWO-PIECE PLASTIC WHEEL FOR LIGHTWEIGHT AUTOMOBILES

This application is a continuation of application Ser. No. 08/542,495, filed Oct. 13, 1995 now abandoned.

RELATED APPLICATIONS

This patent application is related to commonly-assigned U.S. patent application Ser. No. 08/892,461 still pending for an invention entitled "MOTOR VEHICLE BODY", incorporated herein by reference.

FIELD OF INVENTION

The present invention relates generally to automobiles, and more particularly to wheels for lightweight automobiles.

BACKGROUND OF THE INVENTION

As is well known, consumers demand a choice between many different models of automobiles. Depending on the circumstances, some consumers might desire a simple yet effective automobile, with the principal and indeed overriding consideration being cost. With this in mind, the present invention recognizes that it is possible to provide an effective and useful automobile, the cost of which can be minimized by minimizing the weight of the automobile and by using the novel structure disclosed herein.

More specifically, the present invention recognizes that the cost of an automobile can be minimized by minimizing the weight of its wheels. The cost of a lightweight automobile is relatively low because, among other things, a lightweight automobile can be propelled by a relatively small, fuel-efficient power plant. Additionally, certain lightweight materials happen to be inexpensive, and easy to manufacture.

Indeed, as envisioned by the present invention, a lightweight, useful, low-cost automobile can be provided which has a molded plastic body. After molding, the body is attached to a steel frame which supports the body and drive components. It will readily be appreciated that a molded plastic body is both lightweight, compared to metal automobile bodies, and relatively inexpensive.

As further recognized by the present invention, it is advantageous to further reduce the weight of such an automobile by providing effective and lightweight wheels. As recognized herein, owing to the light weight of a plastic automobile, it is possible to effectively support and operate the automobile on plastic wheels. Moreover, making the wheels of lightweight plastic would reduce the overall weight and, hence, cost of the automobile.

Additionally, the present invention recognizes that still further weight and cost savings would accrue from using plastic as the material for the wheels. More particularly, the reduced weight of plastic wheels vis-a-vis steel or aluminum wheels represents a reduction in weight of the so-called unsprung mass of the automobile, making possible the effective use of a comparatively simplified, cost-effective suspension system.

Accordingly, it is an object of the present invention to provide a lightweight wheel for an automobile which is lightweight and effective. Another object of the present invention is to provide a lightweight wheel for an automobile which is strong. Yet another object of the present invention is to provide a lightweight wheel for an automobile that is cost-effective to manufacture and process.

SUMMARY OF THE INVENTION

A wheel for a motor vehicle includes an outboard unitary plastic wheel rim which defines an inboard-oriented engagement surface. Additionally, the wheel includes an inboard unitary plastic wheel rim that defines an outboard-oriented engagement surface which is conformed for mating with the inboard-oriented engagement surface. Per the present invention, the engagement surfaces are bonded together.

Preferably, the engagement surfaces are conformed for interlocking engagement with each other, and more preferably the engagement surfaces are multi-planar. Indeed, in the preferred embodiment each engagement surface is formed with a first disc-shaped engagement ring which defines a first plane, a second disc-shaped engagement ring which defines a second plane, and an annular ramp surface extending therebetween.

In the preferred embodiment, a plurality of fasteners are engaged with the rims for holding the rims together. The fasteners advantageously are posts that are molded integrally with one of the rims and that are ultrasonically welded to the other rim. Per principles disclosed below, the wheel defines a circumferential periphery, with the periphery in turn establishing a tire channel. An automobile tire is disposed on the tire channel in operable engagement with the rims.

In another aspect of the present invention, an automobile includes a plastic automobile body and a steel automobile frame supporting the body. A plurality of plastic wheels rollably support the frame and body.

In still another aspect of the present invention, in an automobile including a plastic automobile body and a steel automobile frame that supports the body, at least one wheel is provided. The wheel is rotatably engaged with the automobile and includes an outboard unitary plastic wheel rim defining an inboard-oriented engagement surface and an inboard unitary plastic wheel rim defining an outboard-oriented engagement surface. The surfaces are conformed for mating with each other, and are bonded together.

The details of the present invention, both as to its structure and operation, can best be understood in reference to the accompanying drawings, in which like reference numerals refer to like parts, and in which:

BRIEF DESCRIPTION OF THE DRAWINGS

FIG. 1 is a perspective view of an automobile having a plastic body, with the lightweight wheel of the present invention shown in operable engagement therewith, with portions of the automobile cut-away and portions shown in phantom;

FIG. 2 is a cross-sectional view of the wheel of the present invention, as seen along the line 2—2 in FIG. 1, with the tire removed and with a portion of the wheel that is symmetrical to the shown portion broken away for clarity of disclosure;

DETAILED DESCRIPTION OF THE PREFERRED EMBODIMENT

Figure 3:
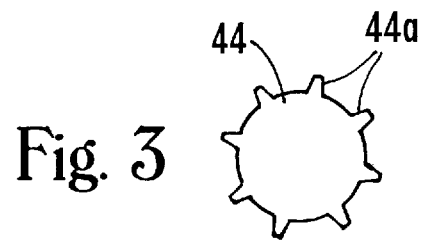
FIG. 3 is a top plan view of one of the connecting posts of the present invention.

Referring initially to FIG. 1, a lightweight, two-piece plastic automobile wheel, generally designated 10, is shown fixedly engaged with a rubber automobile tire 11 and rotatably operably engaged with an automobile, generally designated 100, for rollably supporting the automobile 100. As shown, the automobile 100 includes a power source 102 and a plastic body 104 mounted on a steel frame 106, shown in phantom in FIG. 1. Details of the automobile 100 are disclosed in the above-referenced patent application. As disclosed in the above-referred to application, the automobile body 104 is made of a fiberglass-reinforced engineering plastic composite material by injection molding.

Referring now to FIG. 2, the wheel 10 includes an outboard unitary plastic wheel rim 12. By unitary is meant that the outboard rim 12 is unitarily made, preferably by injection molding. In the presently preferred embodiment, the outboard rim 12 is made of fiberglass-reinforced engineering plastic, such as that available from Hoechst-Celanese under the trade name Celstran PET 15 having 15% fiberglass by weight.

Additionally, the wheel 10 includes an inboard unitary plastic wheel rim 14 which is made of the same material as the outboard rim 12. As shown in FIG. 2, the outboard rim 12 defines a multi-planar inboard-oriented engagement surface 16, and the inboard rim 14 defines an outboard-oriented engagement surface 18 which is conformed for mating with the inboard-oriented engagement surface 16. The inboard-oriented engagement surface 16 is so named because it is oriented inboard relative to the automobile 100, whereas the outboard-oriented engagement surface 18 is oriented outboard relative to the automobile 100.

Preferably, the engagement surfaces 16, 18 are conformed for interlocking engagement with each other, in that the engagement surfaces 16, 18 are multi-planar and are complementarily configured for close engagement with each other substantially throughout their entire surface area. Specifically, in the preferred embodiment shown, the inboard-oriented engagement surface 16 of the outboard rim 12 is formed with an outer flat, disc-shaped engagement ring 16a defining a first plane and an inner flat disc-shaped engagement ring 16b defining a second plane. The plane defined by the outer ring 16a is parallel to the plane defined by the inner ring 16b, with the outer ring 16a being concentric with and having a diameter greater than the inner ring 16b.

Also, the inboard-oriented engagement surface 16 of the outboard rim 12 is formed with a first annular ramp surface 16c that extends between and is concentric with the rings 16a, 16b. As shown, the first ramp surface 16c is not orthogonal to the rings 16a, 16b, but rather the first ramp surface 16c is oriented obliquely to the rings 16a, 16b.

Still describing the outboard rim 12, the inboard-oriented engagement surface 16 is formed with a second annular ramp surface 16d that is concentric with and that is oriented obliquely relative to the rings 16a, 16b. The second ramp surface 16d extends radially inwardly, relative to the wheel 10, from the inner ring 16b to a central circular lug surface 16e. As shown, the lug surface 16e is substantially co-planar with the outer ring 16a.

As discussed above, the outer surface 18 of the inboard rim 14 is configured complementarily to the inner surface 16 of the outboard rim 12, for interlocking engagement therewith. More particularly, the outboard-oriented engagement surface 18 of the inboard rim 14 is formed with an outer flat, disc-shaped engagement ring 18a defining a first plane and an inner flat disc-shaped engagement ring 18b defining a second plane. The plane defined by the outer ring 18a is parallel to the plane defined by the inner ring 18b, with the outer ring 18a being concentric with and having a diameter greater than the inner ring 18b.

Also, the outboard-oriented engagement surface 18 of the inboard rim 14 is formed with a first annular ramp surface 18c that extends between and is concentric with the rings 18a, 18b. As shown, the first ramp surface 18c is not orthogonal to the rings 18a, 18b, but rather the first ramp surface 18c is oriented obliquely to the rings 18a, 18b.

Furthermore, the outboard-oriented engagement surface 18 of the inner ring 14 is formed with a second annular ramp surface 18d which is oriented obliquely relative to the rings 18a, 18b, and which is concentric with the rings 18a, 18b. The second ramp surface 18d extends radially inwardly, relative to the wheel 10, from the inner ring 18b to a central circular lug surface 18e. As shown, the lug surface 18e is substantially co-planar with the outer ring 18a.

With this combination of structure, it will be appreciated that the rings 16a,b, ramps 16c,d, and lug surface 16e of the inboard-oriented engagement surface 16 are respectively positioned against the rings 18a,b, ramps 18c,d, and lug surface 18e of the outboard-oriented engagement surface 18 for effecting an interlocking engagement of the outboard rim 12 and inboard rim 14. The surfaces 16, 18, however, are not flush with each other throughout their entire surfaces. Instead, generally triangularly-shaped spacers 20 are molded integrally onto the surface 16 to abut the surface 18 and thereby establish an adhesive gap 22 between the surfaces 16, 18. In accordance with the present invention, the engagement surfaces 16, 18 are adhesively bonded together by depositing an adhesive 24 in the gap 22 between the rims 12, 14. The skilled artisan will appreciate that with the above-described combination of structure, a uniform thickness of the adhesive 24 is advantageously established.

In one presently preferred embodiment, the adhesive 24 is a polymeric adhesive characterized by a capability to be mechanically stretched 50%–200% and preferably about 100% before it mechanically fails. In this presently preferred embodiment, the adhesive 24 is a type 8000/6660 adhesive made by Ashland Chemical Co. of Dublin, Ohio.

In addition to the bonding structure described above, the inboard rim 14 is formed with an outer shear ring 26 which defines an adhesive surface 26a that is parallel to and that circumscribes the axis 28 of rotation of the wheel 10. As shown in FIG. 2, an annular locking land 30 depends radially inwardly from the outboard end of the adhesive surface 26a.

As further shown, the outboard rim 12 is formed with an inner shear ring 32 which defines an adhesive surface 32a that is parallel to and that circumscribes the axis 28 of rotation of the wheel 10. The inner shear ring 32 is positioned flush against the outer shear ring 26, and adhesive is deposited between the shear rings 26, 32 to bond them together and thereby hold the outboard rim 12 in engagement with the inboard rim 14. Moreover, an annular locking groove 34 is formed in the inner shear ring 32 adjacent the locking land 30, and the locking groove 34 is configured for closely receiving the locking land 30 to thereby establish further engagement between the rims 12, 14.

Continuing with the description of FIG. 2, the wheel 10 defines a circumferential periphery 36 that establishes a tire channel 38. The tire channel 38 is configured as a conventional tire channel which has a conformation appropriate for holding the tire 11 in engagement with the wheel 10. It can be readily appreciated in cross-reference to FIGS. 1 and 2 that the automobile tire 11 is disposed on the tire channel 38 in operable engagement with the rims 12, 14 of the wheel 10 by means well-known in the art.

Desirably, a valve stem 40 is engaged with the rims 12, 14 in accordance with principles well-known in the art. As envisioned by the present invention, to avoid damage to the wheel 10 caused by overpressurizing the tire 11, the valve stem 40 includes a relief valve 42 (shown schematically in FIG. 2) which relieves pressure on the wheel 10 when the tire 11 pressure exceeds a predetermined setpoint, e.g., one hundred twenty pounds per square inch (120 psi).

In addition to the bonding provided by the cooperation of the shear surfaces 26, 32 and by the cooperation of the engagement surfaces 16, 18, to further reduce the likelihood of the rims 12, 14 peeling apart after they are adhesively bonded together, a plurality of fasteners 44 are engaged with the rims 12, 14. In the presently preferred embodiment, the fasteners 44 are posts that are formed integrally on the inboard rim 14 and that are disposed in post receptacles 46 that are formed on the outboard rim 12, although the posts and receptacles can be reversed on the rims 12, 14. FIG. 3 shows that each post fastener 44 is formed with ultrasound fins 44a to facilitate ultrasonically welding the post fasteners 44 into their respective receptacles 46. Alternatively, the fasteners 44 can be metal rivets or snaps.

The wheel 10 is held onto the automobile 100 by means well-known in the art, i.e., by three to five unitarily-made steel lug nuts 48. Each lug nut 48 is made with a respective internally threaded cylindrical shank 50 for engaging a complementarily-threaded receptacle on the automobile 100. Preferably, the end of the shank 50 is chamfered. Further, each lug nut 48 is formed with a respective head 52 which is radially enlarged relative to the shank 50, and a respective radially enlarged disc-shaped washer 54 is integrally formed on each lug nut 48 between the associated head 52 and shank 50. In the preferred embodiment, the diameter "d" of the washer 54 is about two inches (2").

Accordingly, each washer 54 has a relatively large surface area. Consequently, the large metal washers 54, compared to relatively smaller metal surfaces, are less likely to cause scalloping and other damage to the outboard rim 12 when the associated lug nut 48 is tightened to urge the washer 54 firmly and snugly against the outboard rim 12.

Figure 4:
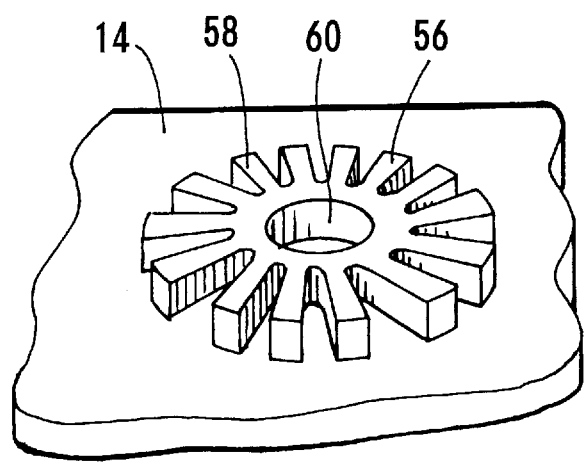
FIG. 4 is a perspective view of a lug receptacle of the inner rim.

A lug receptacle 56 is established by the rims 12, 14 for receiving one of the lug nuts 48 therethrough, and for further establishing the adhesive gap 22 between the rims 12, 14. FIG. 4 best shows that the lug receptacle 56 includes a plurality of ribs 58 and a lug bore 60.

Referring back to FIG. 2, an axle guide 62 is established by the outboard rim 12 for guiding the wheel 10 into engagement with the axle of the automobile 100. In turn, the inboard rim 14 is keyed to the axle guide 62 to properly orient the inboard rim 14 vis-a-vis the outboard rim 12. In the preferred embodiment shown, the axle guide 62 is established by an inboard-oriented frusto-conical central wall 64 which establishes an angle α with the axis 28 of about seven and one-half degrees (7.5°).

In addition to the reduction in weight afforded by the plastic wheel 10, the wheel 10 is rendered relatively strong, owing to its two-piece construction. Moreover, the wheel 10 affords other advantages by virtue of its plasticity. More specifically, the plastic wheel 10 can slightly flex under load, such that the wheel 10 is characterized by a degree of "forgiveness" under turning conditions. Stated differently, during operation of the automobile 100 the wheel 10 is more compliant than a metal wheel would be, thereby absorbing slip angles during turns and thus improving the steering and handling of the automobile 100 as compared to operation with steel or aluminum wheels.

While the particular TWO-PIECE PLASTIC WHEEL FOR LIGHTWEIGHT AUTOMOBILES as herein disclosed and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims.

We claim:

1. A wheel for a motor vehicle, comprising:

an outboard unitary plastic wheel rim defining an inboard-oriented engagement surface and an inner shear ring, said inboard-oriented engagement surface including a first disc-shaped engagement ring defining a first plane, a second disc-shaped engagement ring defining a second plane, and an annular ramp surface extending therebetween;

an inboard unitary plastic wheel rim defining an outboard-oriented engagement surface and an outer shear ring, said outboard-oriented engagement surface including a first disc-shaped engagement ring defining a first plane, a second disc-shaped engagement ring defining a second plane, and an annular ramp surface extending therebetween, said inner and outer shear rings defining a peripheral adhesive surface parallel and circumferential to an axis of the wheel; and at least one spacer integrally formed on at least one of said first engagement rings such that said first engagement ring of said outboard unitary plastic wheel rim is substantially closely spaced from said first engagement ring of said inboard unitary plastic wheel rim.

2. The wheel of claim 1, wherein said engagement surfaces are conformed for interlocking engagement with each other.

3. The wheel of claim 1, further comprising a plurality of fasteners engaged with said rims for holding said rims together.

4. The wheel of claim 3, wherein said rims together define a circumferential periphery adapted for operably engaging an automobile tire.

5. The wheel of claim 2, further comprising:

an annular locking land depending radially inward from an outboard end of said outer shear ring; and an annular locking groove disposed radially along said inner shear ring adjacent said annular locking land for substantially closely receiving said annular locking land.

* * * * *